Oct. 16, 1923.
J. C. FREDERICK
SPRAYER
Filed Feb. 24, 1920
1,471,256
2 Sheets—Sheet 1
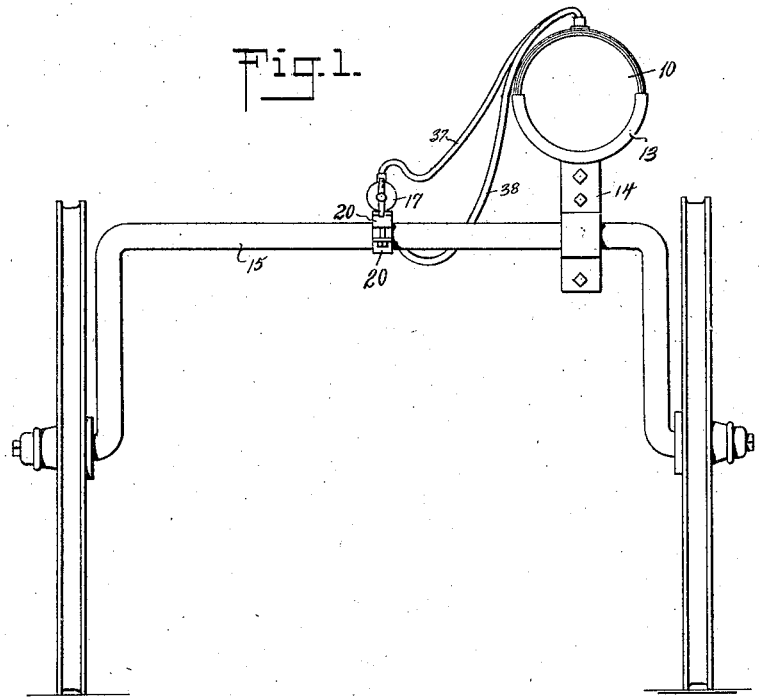
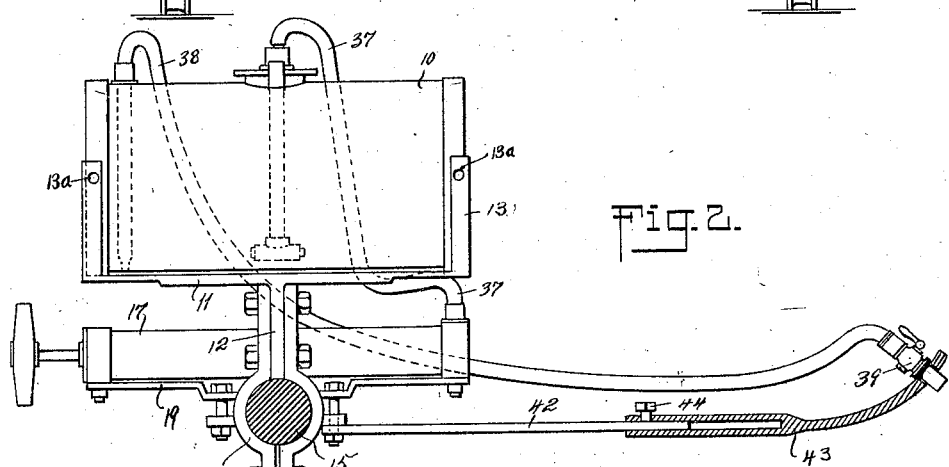
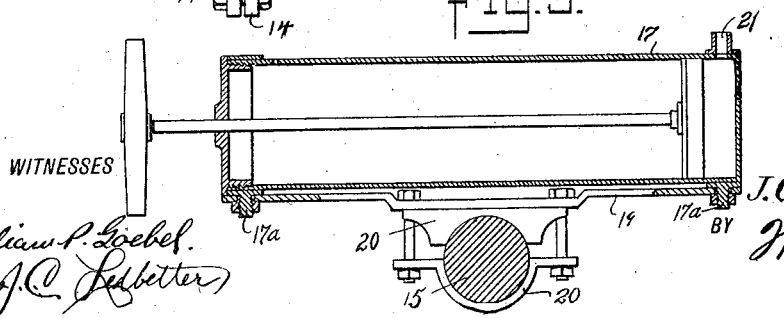
WITNESSES
*William P. Goebel.*
*J. C. Ledbetter*
INVENTOR
*J. C. Frederick.*
BY
*Munn & Co*
ATTORNEYS Oct. 16, 1923.

J. C. FREDERICK

SPRAYER

Filed Feb. 24, 1920

WITNESSES
Wm P. Goebel
J. C. Ledbetter

INVENTOR
J. C. Frederick.
BY
ATTORNEYS

Patented Oct. 16, 1923.

1,471,256

UNITED STATES PATENT OFFICE.

JOHN C. FREDERICK, OF BETHLEHEM, PENNSYLVANIA.

SPRAYER.

Application filed February 24, 1920. Serial No. 361,069.

*To all whom it may concern:*

Be it known that I, JOHN C. FREDERICK, a citizen of the United States, and a resident of Bethlehem, in the county of Northampton and State of Pennsylvania, have invented a new and Improved Sprayer, of which the following is a full, clear, and exact description.

This invention relates to agricultural implements and devices, and more particularly to sprayers for farm tools, such as cultivators.

A primary object of the invention is to provide new and improved sprayers constructed in the form of an attachment, and capable of being used in combination with plows, cultivators or other agricultural and farm tools for the purpose of spraying the vegetation during the cultivation thereof. A feature of the invention resides in the fact that the sprayer and associate parts constituting my invention may be easily and conveniently attached to and detached from the frame of the cultivator so that the sprayer may find ready use in connection with the cultivation of plants, or the cultivator may be used without the sprayer attachment.

An additional object of the invention is to provide a tank and pump which are convenient to join together to make a combination spray which may be used separately from the cultivator or plow.

Another object of the invention is to produce an improved sprayer for farm and garden use, simple in design and construction, comprising a minimum number of parts, and unlikely to get out of working order.

With the above principle and other objects in view, the invention has relation to a certain combination and arrangement of parts, several examples of which are set forth in the appended claims defining the invention, and one practical example of which is presented in the following specification and portrayed in the accompanying drawings, wherein;

Figure 1 illustrates an elevation of the sprayer apparatus mounted on the frame of a cultivator or plow, with the cultivator parts removed in order to present a comprehensive view of the attachment.

Figure 2 illustrates an enlarged detail view of the attachment mounted on the frame of the cultivator.

Figure 3 illustrates a longitudinal sectional view of a certain pump employed in connection with the sprayer.

Figure 4:
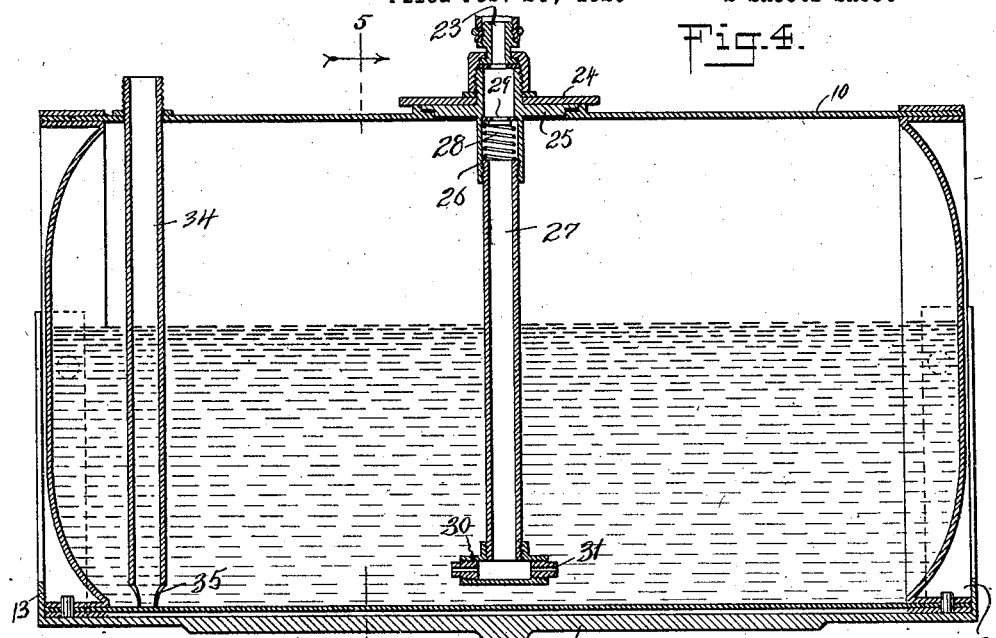
Figure 4 shows a sectional view of a tank containing the spraying liquids together with the parts employed to facilitate the dissemination of the liquids.

A sprayer for plows or cultivators constructed in accordance with the plans of this invention comprises a tank for holding a suitable spraying liquid or disinfectant, which it often is necessary to use in gardens and farms to kill insects living on and destroying vegetation. A pump is connected with the tank and is capable of compressing the air in the tank for forcing the liquid therefrom through a spray nozzle on to the plants. A novel form of adjustable bracket is employed for holding the spray nozzle in position to spray the plants under cultivation. Novel features and detail parts of construction are more particularly described in the following specification.

The sprayer device is made in the form of an attachment and is readily connected and disconnected with plows or cultivators so that the sprayer may be mounted on the cultivator at any time it is found that the vegetation to be cultivated is infested with insects.

In presenting a fuller description of my invention there is shown in the drawings a tank or reservoir 10 which holds the spray liquid. Means constituting part of my invention is provided for the purpose of mounting the tank on a cultivator or plow. To this end a tank receptacle or cradle is constructed by employing a supporting bar 11 having an integral leg 12, and on each end of the supporting bar there is made an arcuate bracket 13, which is preferably constructed of angle iron or other suitable material in order to form a support for the ends and the cylindrical body of the tank. The tank is freely supported in the cradle and may be lifted out of the cradle when the spraying attachment is removed from the plow. A clamping bracket comprising two holders 14 is bolted around the cultivator bar or axle 15, and the leg of the cradle is interposed between the two upper ends of the clamping bracket and securely bolted thereto. When the bolts held by the clamping bracket are set up tight the entire cradle and tank holding means is permanently and securely held in proper position over the cultivator as shown in Figures 1 and 2. It is seen, therefore, that the tank may be readily removed from the cultivator without the necessity of loosening and removing the bolts. This makes for the convenience in use of the spraying apparatus on farms.

A pump 17 is mounted over the cultivator bar or axle in convenient position adjacent the driver of the cultivator in order that he may operate the pump to force air under pressure into the tank 10. This pump is provided with a clamp bracket 20 for securely holding it to the cultivator axle 15. The pump and attachment means is constructed by employing a pump bracket 19 to which is attached the clamp parts 20, and the clamp is secured around the cultivator axle to hold the pump in rigid horizontal position or any convenient position. The pump bracket 19 has a hole in each end, and the pump has a threaded stud on each end which registers in the holes, and nuts are screwed on the studs to clamp the pump on the bracket. This form of pump bracket attachment relieves the pump cylinder of undue strain, or exerting and holding force against each end thereof when the operator is working the pump. The pump has an outlet nipple 21 for connection with an air hose, as later seen.

As hereinbefore set forth, it is an object to produce a spreader having a tank and pump which may be joined together for use separately from the cultivator. This is accomplished by providing a hole 13$^a$ in the upper end of each cradle bracket 13; and holes are also provided in the rim of the tank to register with the holes 13$^a$. The threaded studs 17$^a$, fixed on each end of the pump, will register with the holes 13$^a$ when the pump is applied to the side of the tank; and the pump is anchored on the tank by employing nuts tightened on the studs inserted through the holes 13$^a$ in the same manner as the pump is held on the pump bracket 19. This arrangement permits the agriculturist to remove the spraying attachment from the cultivator and convert it into a portable device, which increases the utility of the sprayer.

Figure 5:
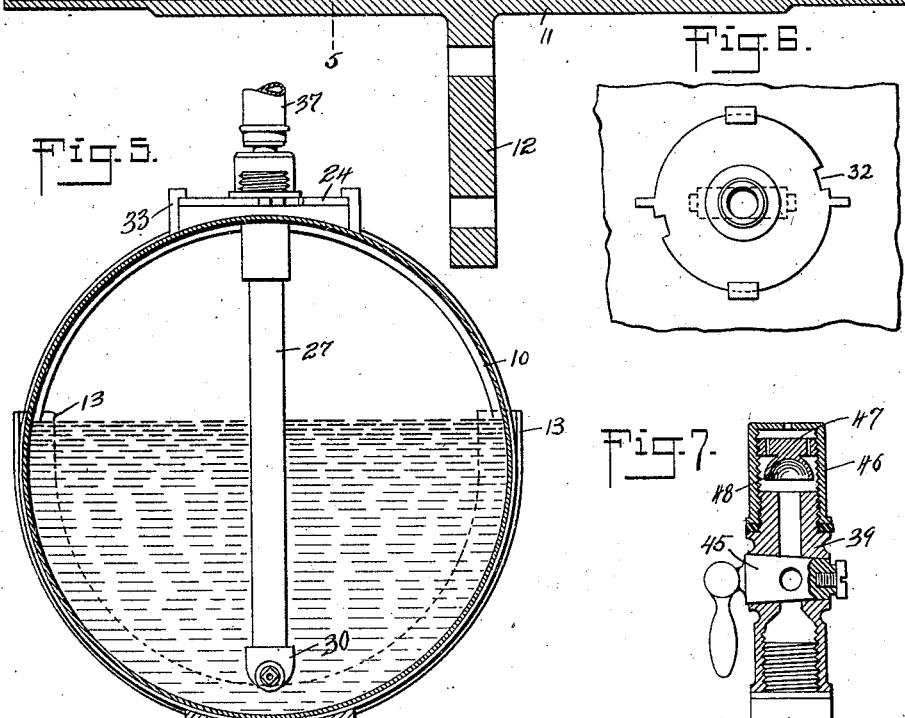
Figure 5 shows a cross sectional view taken on line 5—5 of Figure 4.
Figure 6:
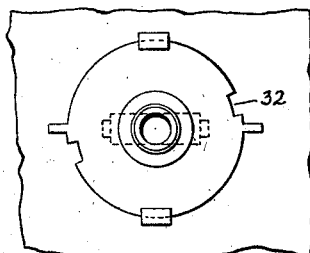
Figure 6 shows a plan view of a closure plug employed to close the tank containing the spraying liquid.

Again referring to the tank 10 which holds the spraying and disinfecting liquid, and with particular reference to the internal details of construction of this tank, comprising a part of my invention, attention is directed to Figs. 4, 5 and 6 of the drawings. A closure plug comprising a cap 24 is made fast to a plug 25, and the plug 25 has a tubular extension 26, internally threaded into which is anchored an inlet pipe 27. A hose nipple 23 is fixed in the upper portion of the closure plug and connected with the air pump, as later mentioned. A spring 28 is confined in the tubular extension and carries a valve cap on the upper end thereof which sits over and closes a valve opening 29 thereby restricting the flow of air or liquid from the tank, but admitting air into the tank from the upper portion of the closure plug. At the lower end, this inlet pipe is provided with a T-fitting 30. It is practical to employ orifice plugs 31 threaded into each end of the T-fitting to pass the air under pressure into the liquid tank. The closure plug 24 is provided with notches 32 which engage with lugs 33 made on the tank to hold the plug in locked position. The plug is inserted in closed position by bringing the notch 32 and lug 33 into registry and turning the cap to lock it under the lugs 33. The inlet pipe 27, together with the closure plug and valve, is combined into a single and unified attachment which is inserted within and removed from the tank by manipulating the closure plug as above described. This arrangement simplifies the design and construction of the tank, and makes it possible to thoroughly clean the tank, likewise thoroughly clean the inlet tube and associate parts by removing it therefrom. A discharge pipe 34 is fixed in the tank and has holes 25 at the bottom thereof to receive the liquid as it is pressed upwardly through the discharge pipe under the influence of compressed air forced into the tank through the inlet pipe 27.

An air hose or flexible connection 37 is connected with the outlet nipple 21 of the pump and fastened to the hose nipple 23 on the closure plug of the tank. The operator is able to drive air from the pump through the hose connection 37 while either riding or walking during the plowing and cultivating operation. Another air hose or flexible connection 38 is connected with the discharge pipe of the tank, and has on the outer end thereof a spray nozzle and valve 39.

An extensible bracket is attached to the plow or device at any convenient point for the purpose of holding the spray nozzle 39 in working position. It is practical to attach this adjustable bracket to the pump clamp 20. In such a case, one of the bolts is removed from the pump clamp and an arm 42 is attached to the bolt in the manner shown in Figure 2. This projects the arm 42 forward where in the outer end is slidably mounted a nipple holder 43. This nipple holder is provided with a socket to receive the end of arm 42, and a set screw 44 is employed to set the two parts together in fixed relation. The outer end of the nipple holder 43 is preferably curved upwardly, where in the outer end there is made a hole for the reception of the discharge nipple of the spray nozzle valve. The spray nozzle valve 39 is securely held by the nipple holder in position forward of the tank and other parts with its nozzle directed at a downward angle for spraying the contents of the tank on the vegetation immediately beneath and slightly ahead of the plow. The extensible bracket comprising the arm 42 and the holder 43 is capable of linear adjustment to increase and decrease the length thereof to vary the spray valve 39 in respect to the plow or the cultivator. The extensible bracket or arm is pivotally mounted on the attachment by virtue of its connection with the bolt on the pump clamp, and may be swung laterally to adjust the spraying position of the nozzle 39 relatively to the row of plants being cultivated. The extensible arm may be adjusted laterally or side to side, in order to bring the liquid being sprayed near one side or the other of the vegetation, if such action should be desired on the part of the operator.

Figure 7:
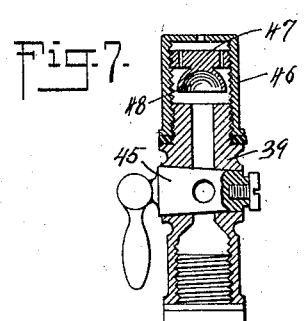
Figure 7 shows a sectional view of a valve employed to spray the liquid issuing from the tank.

Any particular design of spraying valve 39 may be employed, but in a spraying apparatus of this character, it is of advantage to use a certain type of valve as more particularly shown in the design of Figure 7. This drawing discloses a novel type of spray valve comprising the valve body 39 with a cut-off 45. The valve body has a cap 46 fastened on the end thereof, and preferably threaded thereon. The cap is internally threaded and holds a perforated plug 47, which has a semi-spherical liquid spreader 48 placed in line with the passage through the valve body 39. The cap 46 is provided with a spray orifice in the end thereof through which the liquid is sprayed upon the plants. The perforated plug 47 may be rotated in cap 46 to adjust its relation in regard to either end of the cap or valve body. When the liquid under pressure passes from the valve body 39 it projects against the semi-spherical spreader, thereby breaking the liquid into fine spray and globules. This type of spray nozzle breaks up the liquid into a spray of minimal globules and disseminates it over the vegetation in an even manner, leaving a film of insect-killing substance over the plants.

This spraying attachment may be used to the same good effect on a walking or riding cultivator, and in either case the pump 17 is accessible to the operator for manipulating the plunger. The pump is of any practical and improved construction. The device is simple to remove from the plow and likewise easy to mount on the plow in view of the fact that the rubber hose connection may be readily slipped from the several points of attachment, and, also, the tank may be easily removed from the cradle without the necessity of removing bolts or screws.

The operator drives the pump back and forth to press air through the intake pipe 27 and outwardly through the orifice nozzles 31, which stirs and agitates the liquid, serving to keep it thoroughly mixed during the operation of the apparatus. The air under pressure collects in the upper portion of the tank 10, which drives the liquid out through the discharge pipe 34, and disseminates the liquid through the spray nozzle 46.

I claim:

1. A spraying device for use with plows or cultivators, comprising a tank having a spray nozzle, a cradle for supporting the tank having means for detachably securing it to a plow or cultivator, a pump communicating with the tank, a bracket for supporting the pump having means for detachably securing it to a plow or cultivator, and a swinging and extensible arm to which the spray nozzle is secured.

2. The combination with a spraying device for use with plows or cultivators including a tank, a pump and a spraying nozzle, of a detachable tank support, a detachable pump support, and an extensible arm carried by the pump support for regulating the position of the spraying nozzle.

3. The combination with a spraying device for use with plows or cultivators including a tank and a pump, the pump being provided with threaded studs having nuts thereon, of a cradle for the tank provided with openings adapted to receive the studs of the pump so as to secure the pump to the cradle at the sides of the tank.

4. The combination with the axle of a plow or cultivator, of a spraying device including a tank and pump, a cradle for supporting the tank, means for securing the cradle to the axle, a bracket, means for securing the bracket to the axle, and means for detachably securing the pump to the bracket.

5. In a spray apparatus, a tank, a discharge pipe extending into the tank and having an opening at its lower end, an intake pipe in the tank and having openings at its lower end, a closure plug having a tubular extension, one portion of which projects outside of the tank and the other portion projecting into the tank and to which the intake pipe is secured, a hose nipple secured to the outer end of the plug extension, and a spring pressed valve in the inner end of the plug extension.

6. A reservoir construction for spray apparatus, comprising a tank, a discharge pipe having an opening at the lower end thereof carried in the tank, an intake pipe having openings on the lower end thereof carried in the tank, a closure plug for closing the filler opening in the tank, said closure plug being attached to the intake pipe and carrying a hose nipple and a valve carried within the intake pipe to close and open to admit air under pressure to the tank, but to restrain the air or contents of the tank from flowing out.

7. A spraying apparatus for use in combination with cultivators, or for use as a portable apparatus separate from cultivators, comprising a tank for holding spray liquid, a tank cradle fixed to the cultivator adapted to support the tank, a bracket fixed to the cultivator, a pump carried on the bracket, and a connection made on each end of the pump to anchor said pump to the pump bracket, said connection also arranged to anchor the pump to the aforesaid tank and cradle.

8. In a spraying device for use with a plow or cultivator, a pump, a bracket for detachably securing a member of the spraying device to the plow or cultivator, and a nozzle carrying arm pivotally mounted on the bracket, said arm being formed of telescoping sections and provided with means for holding the sections in fixed relation.

JOHN C. FREDERICK.